March 6, 1956  R. K. PEPPER  2,737,273
POSITIVE, SELF-LOCKING CLUTCH
Filed April 24, 1951  5 Sheets-Sheet 1

ROBERT K. PEPPER
INVENTOR

ATTORNEY

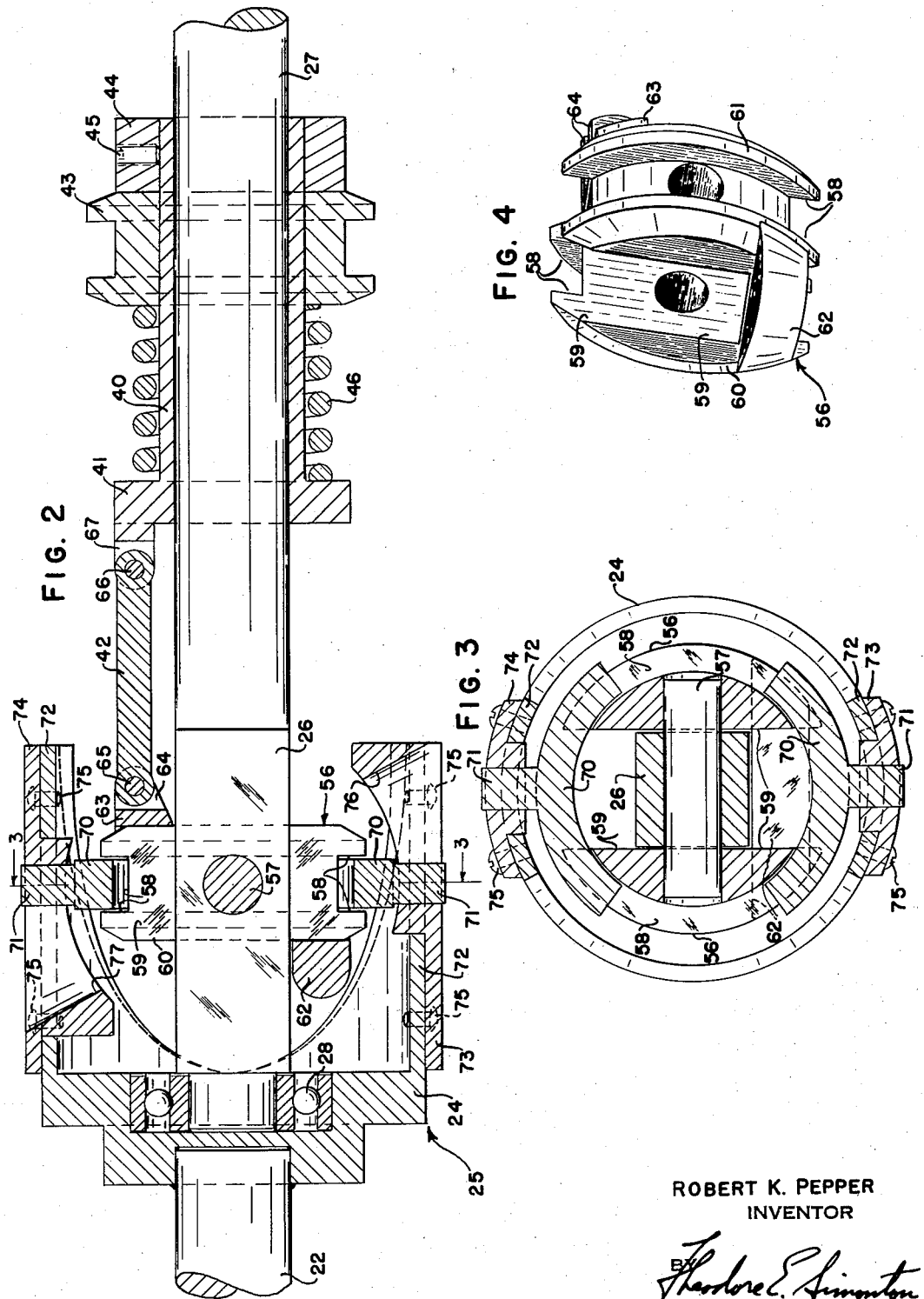

March 6, 1956 R. K. PEPPER 2,737,273
POSITIVE, SELF-LOCKING CLUTCH
Filed April 24, 1951 5 Sheets-Sheet 3
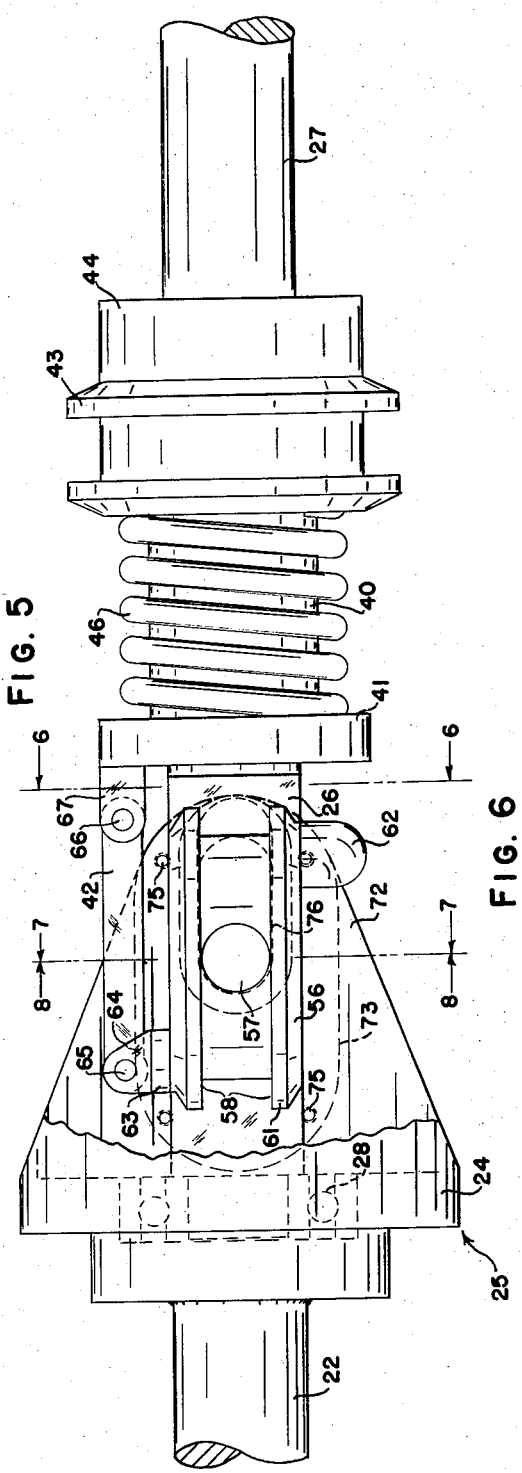
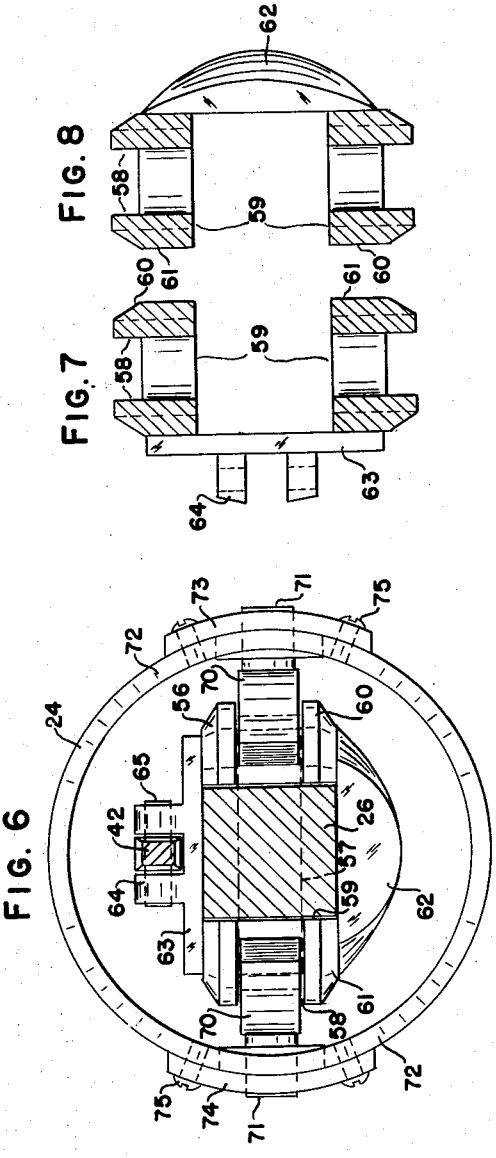
ROBERT K. PEPPER
INVENTOR
BY Theodore E. Simonton
ATTORNEY

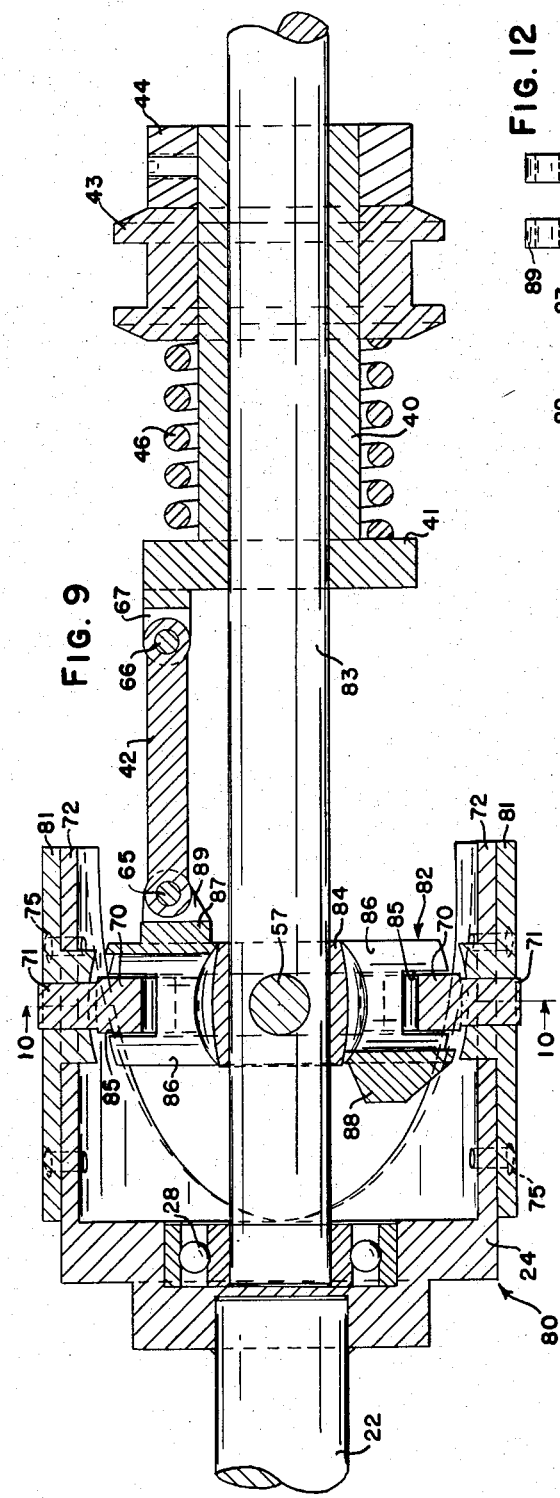

March 6, 1956  R. K. PEPPER  2,737,273
POSITIVE, SELF-LOCKING CLUTCH
Filed April 24, 1951  5 Sheets-Sheet 5
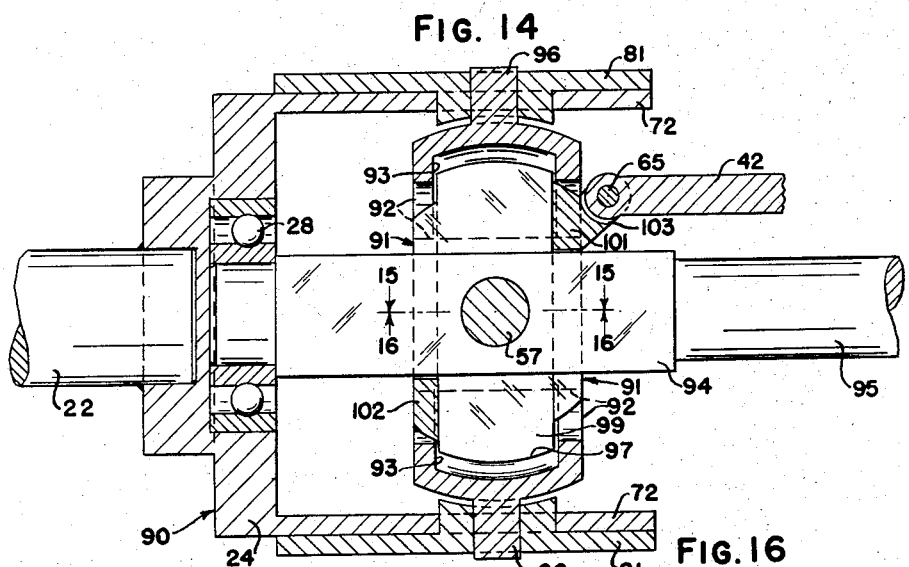
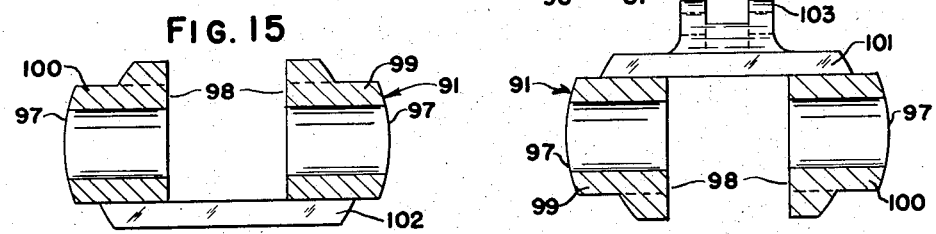
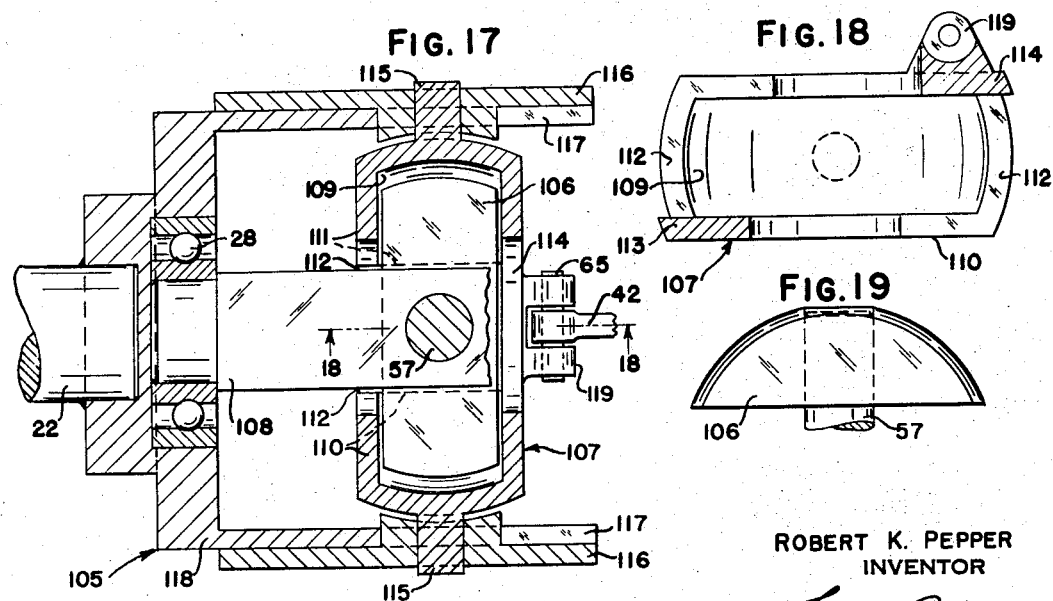
ROBERT K. PEPPER
INVENTOR
ATTORNEY

United States Patent Office 2,737,273
Patented Mar. 6, 1956

2,737,273
POSITIVE, SELF-LOCKING CLUTCH
Robert K. Pepper, Syracuse, N. Y.

Application April 24, 1951, Serial No. 222,685

9 Claims. (Cl. 192—30)

This invention relates to a positive action, self-locking clutch and means for operating a pair of said clutches in a power transmission apparatus.

In the transmission of power in machinery in which changes in speed or in the direction of rotation is desired and in which the normal initial load is not so great as to cause undue shock, it is customary to use positive clutches such as the common jaw clutch. These jaw clutches are often unsatisfactory because it is difficult to bring the jaw elements into clutching engagement with each other while the power source is in operation. In motor boats, particularly, there has long been a need for a cheaply constructed power transmission mechanism by which the direction of rotation of the propeller shaft may be reversed and which provides positive clutching means which is easily engaged or disengaged while the motor is running.

Clutch mechanisms of the tilting disk type have been heretofore used in such situations, but have not proved satisfactory because not self-locking due to the disk elements being limited to less than ninety degrees of tilt. The necessary addition of a locking device to such disk clutches is an added expense and makes the clutch considerably more difficult to operate.

The clutch mechanism which is the subject of the present invention is of the tilting disk type and constitutes an improvement on the device disclosed by Robert K. Pepper and Samuel C. V. Pepper in United States Patent 2,103,791, issued December 28, 1937.

The principal objects of this invention are to provide a simply constructed and operated power drive mechanism peculiarly adapted for use with internal combustion engines in boats and certain types of tractors, by which a change in speed or direction of rotation may be obtained.

Another object of the invention is to provide clutch operating means for a power drive mechanism utilizing positive clutches whereby one of a pair of clutches may be alternatively and selectively engaged while the other clutch is disengaged.

Another object of the invention is to provide a power transmission mechanism having incorporated therein a positive and self-locking clutch mechanism which may be quickly and easily moved into and out of the clutching position without discontinuing or excessively retarding the operation of the power source.

Further objects are to provide a positive, self-locking clutch mechanism which may be enclosed in a lubricant or operated as a dry clutch or may be equally effective when exposed to water or other liquids.

Still further objects are to provide a positive clutch mechanism which will operate with the minimum amount of friction in the de-clutched, or idling, position and which will be positively self-locked in the clutched position.

Other objects and advantages pertaining to the construction of the device and to the form and relation of its parts will more fully appear from the following description, taken in connection with the accompanying drawings, in which:

Figure 2 is a transverse sectional view of one of the two clutch mechanisms of Figure 1, shown in unclutched position;

Figure 3 is a sectional view taken on the line 3—3 of Figure 2;

Figure 4 is a perspective view of the tilting disk clutch element thereof;

Figure 5 is a side elevational view of the clutch mechanism of Figure 2 in clutched position, a portion of the drive member being broken away and the segment clutch elements being omitted;

Figure 6 is a sectional view taken on the line 6—6 of Figure 5;

Figure 7 is a sectional view of the tilting disk clutch element taken on the line 7—7 of Figure 5;

Figure 8 is a sectional view of the tilting disk clutch element taken on the line 8—8 of Figure 5;

Figure 9 is a transverse sectional view of a modified form of clutch mechanism;

Figure 10 is a sectional view of the tilting disk clutch element taken on the line 10—10 of Figure 9;

Figure 11 is a side view of the tilting disk clutch element as viewed from the right in Figure 9;

Figure 12 is a top plan view of the tilting disk clutch element of Figure 9;

Figure 13 is a bottom plan view of said tilting disk clutch element;

Figure 14 is a transverse sectional view of a portion of another modified form of clutch mechanism;

Figure 15 is a sectional view of the tilting disk element taken on the line 15—15 of Figure 14;

Figure 16 is a sectional view of the tilting disk element taken on the line 16—16 of Figure 14;

Figure 17 is a transverse sectional view of a portion of still another modified form of clutch mechanism;

Figure 18 is a sectional view of the outer grooved clutch element taken on the line 18—18 of Figure 17; and Figure 19 is a side elevational view of one of the tilting segment elements of the clutch of Figure 17.

Power transmission mechanism

Figure 1:
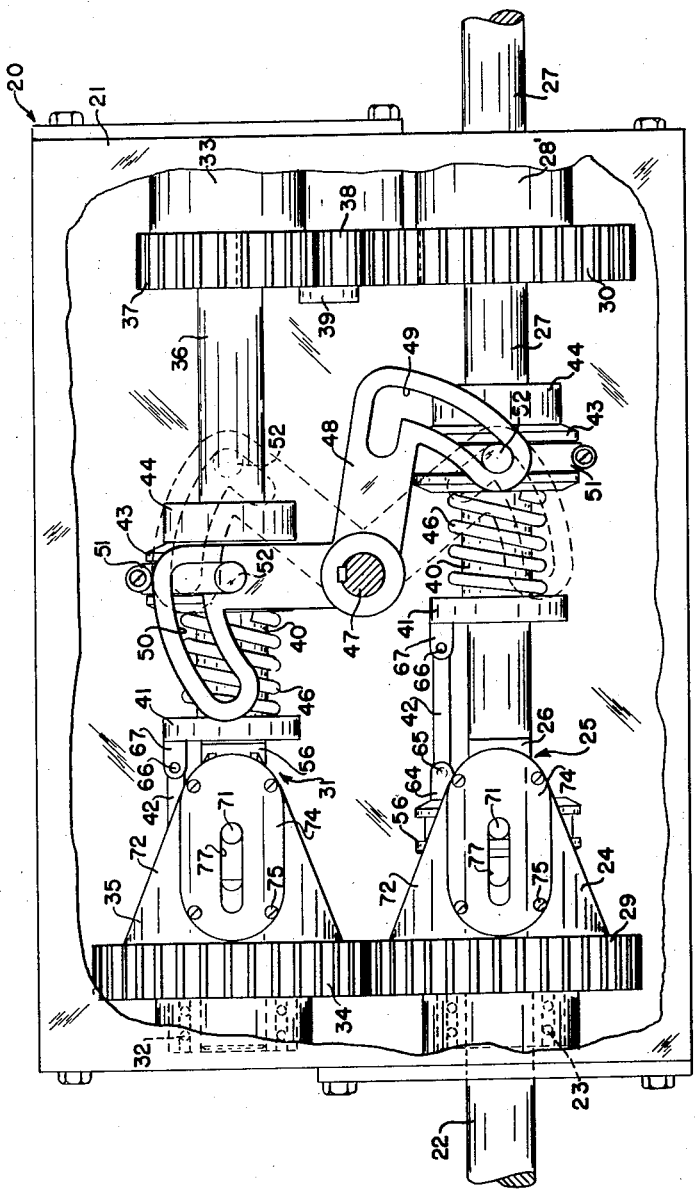
Figure 1 is a side elevation of a power transmission mechanism of the reversing gear type according to this invention, certain parts thereof being broken away.

Referring more particularly to the drawings, the reversing gear 20 of Figure 1 comprises a conventional gear case 21, one side of which is broken away to show the interior parts. A drive shaft 22 is journalled at 23, in conventional manner, within case 21. Drive shaft 22, as shown in Figure 2, terminates in, or is joined to, a cup-shaped drive member 24 of a clutch mechanism 25, hereinafter more fully described. The driven member 26 of the clutch mechanism 25 is preferably square and formed integrally with a driven shaft 27, which is coaxial with drive shaft 22. The driven shaft 27 is journalled at one end in a bearing 28 (Figure 2) which is supported within drive member 24, and is also conventionally journalled in case 21 at 28', where it extends from the case. Spur gears 29 and 30 are mounted respectively on drive member 24 and driven shaft 27 of the clutch mechanism 25.

A similar clutch mechanism 31 is supported parallel to clutch 25 in case 21 by bearings at 32 and 33. A spur gear 34 mating and continuously in mesh with gear 29 is mounted on the drive member 35 of clutch 31. The driven shaft 36 of clutch 31 does not project from case 21, the component parts of clutch 31 thus serving as a countershaft when the clutch is engaged. Driven shaft 36 has a spur gear 37 secured thereto. An idler gear 38 is supported, as by stub shaft 39, adjacent gears 30 and 37, mating and in continual mesh with both.

Clutch operating mechanism

On each of the driven shafts 27 and 36 of clutch mechanisms 25 and 31, respectively, is mounted means for operating said clutch which comprises an operating sleeve 40 together with associated parts. Operating sleeve 40 (Figure 2), at the inner end, has a collar 41. Collar 41 is operatively connected to its associated clutch mechanism by pivoted link 42. A shift collar 43, having an exterior annular groove, is slidably mounted on sleeve 40, and a stop ring 44 is secured to the other end of sleeve 40 by means of set screw 45. A compression coil spring 46, mounted on sleeve 40, is interposed between collars 41 and 43.

Midway between driven shafts 27 and 36 (Figure 1) is a clutch operating shaft 47 journalled in case 21 perpendicular to the plane in which the axes of shafts 27 and 36 lie. Two spiders 48 are keyed to shaft 47, one on either side of shafts 27 and 36, one spider being concealed behind the other in Figure 1. Spiders 48 are identical and each has two L-shaped slots 49 and 50 therein. The base or short leg of slots 49 and 50 is radial to shaft 47 and the long leg is curved about shaft 47 as center.

A split shift ring 51 is rotatably mounted in the annular groove in each shift collar 43. Each shift ring 51 has a pair of diametrically opposite projecting pins 52, which are slidably contained in the slots 49 and 50 of spiders 48. The pins 52 of clutch 25 slide in the slots 49 and the pins 52 of clutch 31 slide in the slots 50 of the two spiders 48.

Figure 1 shows clutch 25 in the unclutched position and clutch 31 in the clutched position. In broken lines is indicated the position of spiders 48 for the neutral position with both clutches in unclutched position. Shaft 47 may be turned by a conventional shift lever, not shown, to shift clutches 25 and 31 from clutched to unclutched position and back again. Slots 49 and 50 are so disposed that when shaft 47 and spiders 48 are turned clockwise, as viewed in Figure 1, clutch 31 is released and clutch 25 is engaged, as hereinafter more fully described. When shaft 47 is turned counter-clockwise, clutch 25 is released and clutch 31 is engaged.

Clutch mechanism

Referring more particularly to Figures 2 to 8, the disk clutch element 56 is tiltably mounted by means of pin 57 on the square driven member 26 of clutch 25. The disk element 56 (Figure 4) is formed preferably in one piece, with an annular exterior groove 58 and a rectangular recess 59 on either side of the pin 57 to admit the square member 26 of shaft 27 when disk element 56 is tilted 90 degrees from the position shown in Figure 2 to that shown in Figure 5. In effect, therefore, disk 56 may be said to be formed of two segmental portions 60 and 61 of a short, grooved cylinder, bridged and joined together, on opposite sides of shaft 27 and on the opposite flat ends of the cylinder, by the bars 62 and 63. Alternatively, of course, disk 56 may be made in separate pieces with portions 60 and 61 joined by bars 62 and 63 attached thereto by screws or the like, in conventional manner. Bar 63 has two ears 64 projecting therefrom to which is hingedly joined the link 42 by means of pin 65 (Figure 2). Pin 66 joins the other end of link 42 to the ears 67 of the collar 41 in a similar manner.

Annular segment elements 70 ride and are guided in the annular groove 58 of the disk 56, when the clutch is disengaged as shown in Figures 2 and 3. The annular segment elements 70 are segmental portions of an annular ring or band of substantially square cross-section, and are of such arcuate length as to be guided by groove 58 and to adequately span the gaps in said groove caused by the recess 59 as clearly shown in Figure 3.

The clutch segment elements 70 are each formed with a radially extending trunnion 71, which is carried by one of the overhanging and diametrically opposite arms 72 of the cup drive member 24. The segment elements 70—70 are thus carried in diametrically opposed, paired relation by the drive member 24. The two segments of the pair 70—70 have an arcuate space or interval between them, on either side, substantially greater than the width of the driven member 26, as clearly shown in Figure 6, to permit the swinging of elements 70 through an arc of ninety degrees about trunnions 71 when the disk element 56 is tilted to clutched position.

To facilitate assembly, plates 73 and 74 are secured to the arms 72 by means of screws 75. Plates 73 and 74 are slotted at 76 and 77 respectively to permit restricted movement of the trunnions 71 in order to facilitate the engagement of the clutch as described below.

Operation

Referring again to Figure 1, it will now be seen that the transmission mechanism hereinabove described comprises a pair of coaxial shafts 22 and 27 which may be joined for simultaneous rotation or direct drive when clutch 25 is engaged and clutch 31 is disengaged, and a pair of coaxial members 35 and 36 which may be joined for simultaneous rotation as a countershaft when clutch 31 is engaged and clutch 25 is disengaged. In direct drive, the countershaft is disabled, and the gears simply rotate freely without driving anything. When clutch 25 is disengaged and clutch 31 is engaged, power is transmitted from the drive shaft 22 to the driven shaft 27 through the gear train 29, 34, clutch 31, and gear train 37, 38 and 30.

Referring to Figures 2 to 8, it will now be evident that, as drive shaft 22 is rotated by the power source with clutch 25 disengaged, drive member 24 carries with it the annular segment elements 70 which ride free and with little friction in groove 58 of the disk element 56.

To engage clutch 25, shaft 47 is turned by its operating lever in a clockwise direction as viewed in Figure 1. The pins 52 of clutch 25 ride free in the curved legs of slots 49 until spiders 48 are in neutral position. Pins 52 are then engaged by the radial portions of slots 49, and as spiders 48 are turned farther in a clockwise direction, the grooved shift collar 43 of clutch 25 is cammed to the left against spring 46. Spring 46 exerts pressure on the collar 41 of operating sleeve 40, urging sleeve 40 to move to the left carrying with it the link 42. When the arms 72 of the drive member 24 reach the position shown in Figures 2 and 3 with respect to the driven member 26, the pressure of spring 46 on collar 41, which is transmitted by link 42, moves the trunnions 71 to the right in slot 76 and to the left in slot 77, thereby tilting the disk 56 about pin 57.

When drive member 24 rotates another quarter turn with respect to driven member 26, to the position shown in Figures 5 and 6, trunnions 71 are moved back in slots 76 and 77 by reason of the sliding of the segments 70 in groove 58. Trunnions 71 and pin 57 now lie along a common axis, and disk 56 is tilted to the position shown in Figures 5 and 6 by the movement of link 42 as urged by spring 46. Drive shaft 22 and driven shaft 27 are thereby effectively locked together and power is delivered to the propeller or other driven mechanism directly from shaft 22 to shaft 27 through drive member 24 and clutch elements 70 and 56.

It will be noted that the segment elements 70, in unclutched position (Figure 3), have an arcuate length considerably greater than the gaps in groove 58 at the recess 59, so that they are guided by groove 58 for unclutched rotation. The arcuate gap between the elements 70, however, is sufficient to admit the driven member 26 therebetween when the clutch elements are tilted to clutched position (Figure 6). Regarding the elements 70—70 as a pair carried by the drive member 24, the arcuate gaps between this pair 70—70 constitute recesses on either side of driven member 26 to permit ninety degree tilting of pair 70—70 about driven member 26.

Referring to Figure 5, it will be seen that the disk 56 is now aligned with the square driven member 26. The rotative force of drive member 24 is transmitted to driven member 26 through trunnions 71 of the segment elements 70, disk 56 and pin 57. Disk 56, being aligned with member 26, is effectively locked in position by the friction, however slight, between the sides of the recesses 59 and the square sides of member 26 and between pin 57 and disk 56.

To disengage the clutch 25, shaft 47 is turned in the opposite direction, counter-clockwise in Figure 1. As spiders 48 turn, the radial legs of slots 49 cam the pins 52 of clutch 25 to the right, carrying shift ring 51 and the grooved shift collar 43 against the stop ring 44 of clutch 25. Stop ring 44 carries operating sleeve 40 and link 42 to the right, tilting the disk member 56 back to the disengaged position shown in Figure 2. Since trunnions 71 and pin 57 are aligned while the clutch is engaged, only slight friction must be overcome between the recesses 59 in disk 56 and the square sides of member 26, to disengage the clutch.

The bridging bars 62 and 63 of disk 56 are preferably spaced from the center of disk 56 as shown, so as to act as stops in the unclutched position. When bars 62 and 63 are equally spaced from pin 57 and the vertical distance between the bars (Figure 2) is equal to the thickness of the square member 26, the bars rest against member 26 and limit the rocking of disk 56 in unclutched position.

It will be noted that when the spiders 48 are turned counter-clockwise to the neutral position indicated in dotted lines in Figure 1, clutch 25 is completely and positively disengaged while clutch 31 is not yet urged toward engagement by reason of the pins 52 of clutch 31 riding in the circular portion of slots 50. As spiders 48 are turned farther, these pins 52 are engaged by the radial portion of slots 50 and collar 43 of clutch 31 is cammed to the left thereby engaging clutch 31 in a manner similar to that described above in connection with clutch 25.

When either clutch 25 or clutch 31 is engaged and shaft 47 is turned, the clutch which is engaged is forced out of engagement and into the neutral position by the radial legs of slots 49 or 50 acting on the pins 52. The pins 52 of the other, disengaged, clutch ride free in the circular legs of the slots 49 or 50, however, until the neutral position of the spiders 48 is reached. Both clutches, therefore, must be disengaged before either clutch is urged toward engagement.

It will also be noted that when the grooved shift collar 43 of clutch 25 or clutch 31 is moved to the left in Figure 1, sleeve 40 is urged to the left by spring 46 and moves only when the trunnions 71 of the segment elements are aligned with pin 57 or are approaching such alignment, and disk 56 is therefore permitted to tilt.

When clutch 25 or clutch 31 is engaged, trunnions 71 and pin 57 are locked in alignment so disk 56 may be tilted out of alignment with member 26 at any time. Therefore, the shift collar 43, when moved to the right, meets the stop ring 44 and may move sleeve 40 and link 42 to the right immediately and positively to tilt the disk 56 to its disengaged position normal to the axis of the driven shaft.

When clutch 25 is engaged, clutch 31 must be disengaged by reason of the operation of the spiders 48. Drive member 24 carries with it the clutch elements and shaft 27 when clutch 25 is engaged. Drive member 35 is also continually turned by reason of the constant meshing of gears 29 and 34, but, since clutch 31 is disengaged, shaft 36 is free to rotate independent of member 35. Since gears 30, 37 and 38 are in constant mesh, shaft 36 rotates with shaft 27.

When clutch 25 is disengaged, shafts 27 and 36 cease to rotate with drive member 24. When clutch 31 is engaged, shaft 36 is locked to, and rotates with, drive member 35 in the opposite direction from member 24. Shaft 27 is then driven by shaft 36, through gears 37, 38 and 30, in the opposite direction from member 24. By properly proportioning gears 37 and 30, shaft 27 may be driven at the same speed forward or in reverse through clutch 25 or clutch 31, respectively, or at a reduced speed, as desired.

Casing 21 may be partially filled with lubricant in conventional manner to lubricate all parts of the transmission mechanism or the casing may be left open and lubricating to gears and clutches supplied in any conventional manner.

It will thus be apparent that the above-described power transmission mechanism provides a simply constructed and operated device suitable for boats or machinery where a simple reversing means is required which may be operated without slowing or stopping the engine or other source of power. The clutch devices shown at 25 and 31 are positive in action and self-locking. Such a clutch may be used in any mechanism permitting a positive clutch, that is, wherever the load carried by the driven shaft is initially not so great as to cause undue shock upon engagement of the clutch.

Modifications

The power transmission mechanism shown in Figure 1 may be varied in conventional manner, of course, to provide changes of speed to the driven shaft 27 by the substitution of gears of different size for the gears 29, 34, 30 and 37. The elimination of the idler gear 38, of course, would allow rotation of the driven shaft 27 in the same direction when either clutch 25 or 31 is engaged. It will also be apparent that, although shaft 22 is referred to as the drive shaft and shaft 27 as the driven shaft, power may be applied to shaft 27, shaft 22 thus becoming the driven shaft. Under these conditions, member 26 would become the drive member of the clutch 25, and member 24 would become the driven member.

Other variations, also, are possible. Shafts 27 and 36 might be interchanged so that the driven shaft might be directly driven by clutch 31 and indirectly driven by clutch 25 through gears 30, 37 and 38.

A modified clutch mechanism 80 is shown in Figures 9 to 13, in which the drive member 24 is substantially that of clutch 25 or 31. Plates 81 are affixed to the arms 72 of member 24 by means of screws 75. The trunnion portions 71 of the segment elements 70 are journalled in plates 81 without any axially extending slots as in plates 73 and 74 of clutch 25. The disk element 82 is tiltably secured to the driven member, shaft 83, by means of pin 57. Shaft 83 may be of uniform diameter throughout but preferably, for extra strength, it is provided with a rounded collar 84 secured thereon, or integral therewith, and through which the pin 57 passes.

The tilting disk element 82 (Figures 10, 11, 12 and 13) has a centrally located annular groove 85 about its perimeter, in which the segment elements 70 ride when the clutch is in disengaged position as shown in Figure 9. On either side of pin 57, the disk 82 has a recess 86 in opposite sides thereof, as shown in Figures 12 and 13, so that the disk may be tilted 90 degrees from its unclutched position. It will be noted that the width of the disk 82 is greater than the diameter of shaft 83. The recesses 86 need not be so deep, therefore, as to split disk 82 in two portions. Bars 87 and 88 serve to reinforce the thin wall sections of disk 82 beneath the recesses 86. On bar 87, the projecting ears 89 constitute means for hingedly attaching link 42 by which the operating sleeve 40 is operatively connected to clutch 80.

The operation of clutch 80 is similar to that of clutches 25 and 31. In unclutched position, as shown in Figure 9, the drive shaft 22, its attached drive member 24 and the clutch segment elements 70, are free to rotate independently from the driven member 83, the segment elements 70 sliding freely in the groove 85 of disk element 82. When member 24 has rotated a quarter of a revolution with respect to shaft 83 from the position shown in Figure 9, trunnions 71 are aligned with pin 57 and the clutch may be engaged by moving the grooved shift collar 43 to the left. The resulting movement of sleeve 40 to the left is transmitted through link 42 to disk 82. Disk 82 is thereby tilted to a position aligned with the axis of shaft 83 and drive member 24 is effectively locked to the driven shaft 83 for rotation together.

In Figure 14 is shown a further modified clutch 90 in which an annular tilting disk element 91 cooperates with segmental elements 92 having an annular groove 93 internally located therein. The disk element 91 is tiltably mounted by means of pin 57 to the driven member 94, which is a square portion on the driven shaft 95.

The drive shaft 22 and the arms 72 of the drive member 24 carry the plates 81 just as in clutch 80, Figure 9. The segmental clutch elements 92 are formed with trunnions 96 which are journalled in plates 81 so that the segmental elements 92 may be pivoted when the trunnions 96 are aligned with pin 57.

Figures 15 and 16 are sectional views of the tilting disk element 91, showing the annular exterior 97 of the disk element 91 recessed at 98 so as to be tiltable ninety degrees about pin 57. Recess 98 splits disk 91 into two portions 99 and 100 which lie on either side of the driven member 94 and are joined together by the bar portions 101 and 102 bridging the recess 98 on opposite sides and on either side of pin 57. The bar portion 101 is provided with the ears 103 to which link 42 is pivotally connected by pin 65.

The operation of clutch 90 is similar to that of the other clutches hereinabove described. In unclutched position, Figure 14, disk 91 rides in the groove 93 of the segment elements 92 and drive member 22 is free to rotate independent of driven member 94. When trunnions 96 and pin 57 are in alignment, disk 91 may be tilted ninety degrees by the operating means connected to link 42. Since the annular portion 97 of disk 91 lies within groove 93 of the segment elements 92, the segment elements are also guided to rotate ninety degrees about trunnions 96, locking drive member 24 to driven member 97 for rotation together.

In Figure 17, still another modified clutch 105 is shown, in which the segment elements 106 are located within the annular tiltable element 107. The segment elements 106 are pivotally mounted on either side of the square driven member 108 by means of the pin 57 and have, as a pair, an annular periphery cooperating with the interior annular groove 109 of the tiltable disk element 107.

The disk element 107 is a short disk-like cylinder, hollow by reason of the interior annular groove 109, and is divided into two halves 110 and 111 by a recess 112 which permits the disk to be tilted about the driven member 108. The recess 112 is bridged on the opposite flat ends of the cylinder and on opposite sides of the driven member 108 by bars 113 and 114, which, in Figures 17 and 18, are shown as being in the plane of the cylinder end walls. The recess 112, therefore, may be considered to be in the opposite cylinder end walls and on opposite sides of member 108, permitting disk 107 to be tilted ninety degrees about member 108.

Disk 107 is provided with diametrically projecting trunnions 115 which are journalled in the plates 116, which in turn are secured to the opposite arms 117 of the cup-shaped driving member 118. Driving member 118 is similar to the driving members of the other clutches herein described except that arms 117 are slotted to facilitate assembly.

The bar 114 is provided with ears 119 to which link 42 of the operating mechanism is hinged by pin 65.

In Figure 17, the clutch 105 is shown in unclutched position and the operation of the clutch will be evident therefrom. The segment elements 106 ride free in the annular groove 109 of the disk member 107 when the clutch is in the position shown, and are guided by the groove when the disk is tilted.

When trunnions 115 are aligned with pin 57, disk element 107 may be tilted. The segments 106, being guided in groove 109, are also tilted and driving member 118 is effectively locked to driven member 108.

It will be noted that the link 42 is joined to the outer clutch element in clutch 105 so that the clutch operating mechanism will rotate with the driving member 118 and drive shaft 22 when the clutch is disengaged, rather than with the driven member 108.

While illustrative embodiments of the invention are herein described and shown in the drawings, it is to be understood that the invention is not limited thereto, but may comprehend other constructions, arrangements of parts, details and features without departing from the spirit of the invention. I desire to be limited, therefore, only by the scope of the appended claims.

I claim:

1. In a clutch mechanism, the combination with a drive member and a driven member mounted in coaxial relation for rotation one within the other, of co-acting clutch elements, means pivotally and permanently connecting each of said elements with a respective one of said members in both unclutched and engaged positions, said elements being oppositely recessed on either side of the inner one of said coaxial members to move from an unclutched position substantially normal to the axis of movement of the members to an engaged position aligned with said axis, and means for moving said clutch elements from unclutched to engaged position.

2. A clutch mechanism having drive and driven members mounted in coaxial relation for rotation one within the other, two diametrically opposed tiltable clutch elements pivotally mounted on one of said members, a third tiltable clutch element pivotally mounted on the other of said members, said two tiltable elements being guided for unclutched rotation with respect to the third element, said third tiltable element being oppositely recessed on either side of the member about which it tilts whereby said tiltable clutch elements may be tilted with respect to the axis of rotation of said members from unclutched position normal to said axis ninety degrees to a locked position aligned with said axis, and means for tilting said clutch elements for positively connecting said members.

3. In a clutch mechanism, the combination with a rotary drive member and a rotary driven member mounted in coaxial relation for rotation one within the other, of a tilting disk clutch element, a pair of segmental clutch elements guided for unclutched rotation with respect to said tilting disk element, means connected with each of said members at diametrically opposite sides thereof for pivotally connecting one of said members to the disk element and the other member to the segmental clutch elements, said tilting disk element being oppositely recessed on either side of the member about which it tilts, and means for tilting the clutch elements with respect to the axis of rotation of the drive and driven members from an unclutched position substantially normal to said axis to a clutched position substantially aligned with said axis, whereby the clutch elements may be moved from an inoperative position in which said clutch elements may rotate relative to each other to a locked operative position in which said clutch elements are maintained against such relative movement and motion is positively transmitted from the drive member to the driven member.

4. A clutch mechanism as claimed in claim 3, in which said tilting means comprises an operating sleeve slidably mounted on one of said rotary members and having a collar at one end, a link having one end hingedly secured to said sleeve and the other end hingedly secured to said tilting disk element, a grooved shift collar slidably mounted on said sleeve, a coil spring mounted on said sleeve between said sleeve collar and said shift collar, a stop ring secured to said sleeve for retaining said spring and shift collar on said sleeve, and a shift ring rotatably mounted in the groove of said shift collar, said sleeve, spring, shift collar and stop ring being so constructed and arranged that all are rotatable with said tilting disk element and movement of said shift ring in one direction compresses said spring and urges said sleeve and link and tilting disk element toward clutched position and movement of said shift ring in the other direction engages said shift collar with said stop ring and moves the sleeve, link and tilting disk element in the other direction to unclutched position.

5. In a clutch mechanism, the combination with a rotary drive member and a rotary driven member mounted in coaxial relation for rotation one within the other, of co-acting clutch elements comprising a tilting element mounted on one of said members for tilting movement about an axis normal to the common axis of said members, and a pair of segmental clutch elements, said segmental elements being guided for unclutched rotation with respect to said tilting element, a pair of diametrically disposed trunnions, each pivotally connecting one of said segmental elements to the other of said members to permit tilting action of said segmental elements in unison with said tilting element when said trunnions are aligned with the axis of tilt thereof, said tilting element having diametrically opposite recesses cooperating with the inner one of said members so as to be tiltable ninety degrees from a position normal to the common axis of said members to a position aligned with said axis, and means for tilting said element.

6. In a clutch mechanism, the combination with a drive member and a driven member mounted in coaxial relation for rotation one within the other, of a pair of disk segmental clutch elements, and a pair of cooperating annular segmental clutch elements, one of said pairs of elements having an annular groove therein and the other pair being adapted for guided unclutched rotation in said groove, one pair of elements being tiltably mounted on one of said members and the other pair of elements being pivotally mounted on the other of said members by a pair of diametrically disposed trunnions, the axis of said trunnions lying in a common plane with the axis of tilt of said tiltable pair of elements, said plane being normal to the axis of rotation of said members, a pair of bars joining said pair of disk elements, one bar across each of the opposite surfaces of said disk elements, and means for tilting said clutch elements, when the trunnion axes coincide with the axis of tilt, from a position normal to the axis of rotation of said members to a position aligned with said axis of rotation, whereby said clutch elements may be tilted ninety degrees to a locked clutched position.

7. A clutch mechanism comprising a drive member and a driven member mounted for coaxial rotation, one within the other, a disk clutch element tiltably mounted on the inner of said members and having recesses in the opposite sides thereof on either side of the inner one of said members to receive said inner member therein when the disk is tilted ninety degrees from normal, said disk having an external annular peripheral groove therearound, a pair of annular segment clutch elements lying in said peripheral groove for unclutched rotation therein, a pair of diametrically disposed trunnions pivotally connecting said segment elements to the outer one of said members, and means for tilting said disk from a position normal to the axis of rotation of said members to a position aligned with said axis when the axis of said trunnions coincides with the axis of tilt of said disk whereby said clutch elements are locked in clutching engagement.

8. A clutch mechanism comprising a drive member and a driven member mounted for coaxial rotation, one within the other, a disk clutch element tiltably mounted on the inner one of said members and having recesses in the opposite sides thereof on either side of said inner member to receive said inner member therein when the disk is tilted ninety degrees from normal, a pair of annular segment clutch elements having an internal annular groove, said disk clutch element lying in said groove for unclutched rotation therein, a pair of diametrically disposed trunnions pivotally connecting said segment elements to the outer one of said members, and means for tilting said disk from a position normal to the axis of rotation of said members to a position aligned with said axis when the axis of said trunnions coincides with the axis of tilt of said disk whereby said clutch elments are locked in clutching engagement.

9. A clutch mechanism comprising a drive member and a driven member mounted for coaxial rotation, one within the other, an annular clutch element pivotally mounted on the outer one of said members by a pair of trunnions for tilting about the inner one of said members, said element having recesses in the opposite sides thereof on either side of said inner member to receive said inner member when said element is tilted ninety degrees from normal, said element having an internal annular groove therein, a pair of segment clutch elements lying in said groove for unclutched rotation therein and being tiltably mounted on either side of said inner member, and means for tilting said clutch elements from a position normal to the axis of rotation of said members to a position aligned with said axis when the axis of said trunnions coincides with the axis of tilt of said segment elements whereby said clutch elements are locked in clutching engagement.

References Cited in the file of this patent
UNITED STATES PATENTS

| | | |
|---|---|---|
| 1,327,880 | Rogers | Jan. 13, 1920 |
| 1,332,229 | Odhner | Mar. 2, 1920 |
| 1,666,717 | Northrop | April 17, 1928 |
| 2,103,791 | Pepper et al. | Dec. 28, 1937 |
| 2,400,765 | McMillan | May 21, 1946 |